June 17, 1941.  F. L. MAIN  2,246,141
MASTER CYLINDER
Filed April 18, 1938
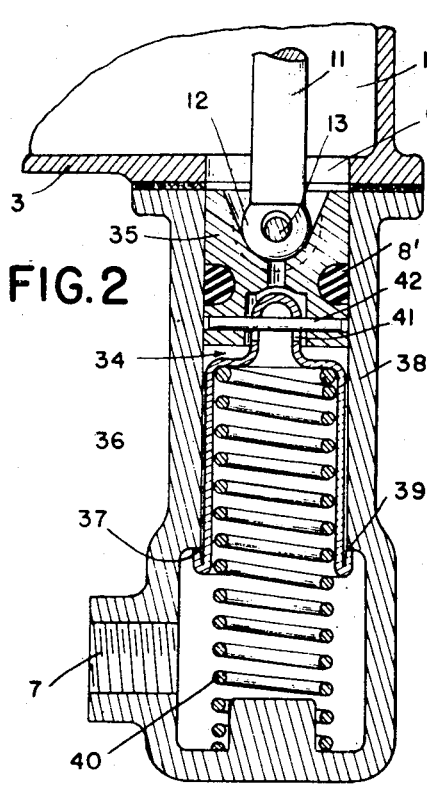
INVENTOR
FRANK L. MAIN
BY *Whittemore Hulbert & Belknap*
ATTORNEYS Patented June 17, 1941

2,246,141

UNITED STATES PATENT OFFICE 2,246,141

MASTER CYLINDER

Frank L. Main, Birmingham, Mich., assignor to Kelsey-Hayes Wheel Company, Detroit, Mich., a corporation of Delaware Application April 18, 1938, Serial No. 202,790

5 Claims. (Cl. 60—54.6)

The invention relates to hydraulic brake apparatus adapted for use with motor vehicles and refers more particularly to master cylinders for producing pressure upon braking fluid to apply brakes.

The invention has for one of its objects to provide an improved construction of master cylinder of that type having a valve controlled ported piston by means of which the pressure end of the cylinder may be placed in communication with the reservoir. The invention has for another object to so construct the master cylinder that the opening of the valve during the final portion of the retractile movement of the piston is assured. The invention has for further objects the novel arrangements and combinations of parts as more fully hereinafter set forth.

In the drawing:

Figure 1 is a vertical section through a master cylinder showing an embodiment of my invention;

Figures 2 and 3 are similar view showing other embodiments of my invention.

Referring to Figure 1, 1 is the reservoir of the master cylinder and 2 the cylinder. The reservoir has the hollow body 3 having an open upper end and the cover 4 which is adapted to be detachably secured to the body and is provided with the breather 5 for the passage of air to and from the reservoir. The cylinder is preferably formed integral with the reservoir body and extends substantially vertically from a point above the bottom of the reservoir body to a point below the same. The upper end of the cylinder is open and, in addition, the upper portion of its inner side wall is slotted at 6 to place the upper position of the cylinder in communication with the reservoir. The lower portion of this cylinder is provided with the port 7 for the passage of the braking fluid under pressure to and away from the usual tubing which extends to any usual construction of actuators or wheel cylinders for operating the brakes of the motor vehicle. The braking fluid is a suitable liquid.

8 is the piston reciprocable within the cylinder 2 and provided with the annular packing member 8' which is preferably in the nature of a rubber ring. The piston is adapted to be advanced and retracted from the foot pedal 9 through the bell crank 10, which latter is located within the reservoir. The bell crank is positively connected to the piston by means of the connecting rod 11 having the ball portions 12 at its opposite ends adapted to engage cooperating bearings upon the piston and bell crank when the piston is being advanced. These ball portions are loosely connected to the piston and bell crank by the pins 13. The bell crank is secured upon the shaft 14 which extends transversely through and is journaled in the side walls of the reservoir body 3. This shaft is connected to the foot pedal by the lever 15 secured upon one end of the shaft beyond the adjacent side wall of the reservoir body and the link 16 between the lever and the foot pedal. The usual spring 17 serves to normally hold the foot pedal in its inoperative or off position and consequently to hold the piston in its fully retracted position.

The piston is provided with the axial or longitudinally extending passage 18 and the arcuate grooves 19 in its bearing for the lower ball portion 12 of the piston rod. The passage and the grooves form a port through the piston providing for the flow of the braking liquid from the reservoir into the pressure end of the cylinder, the flow of the braking liquid from the pressure end of the cylinder to the reservoir and also flow of air or other gas in the braking liquid from the pressure end of the cylinder to the reservoir. The lower portion of the passage 18 is of greater diameter than the upper portion and loosely receives and guides the tubular portion 20 of the sheet metal valve 21 which has the rounded or spherical convex nose 22 at the upper end of the tubular portion adapted to engage the correspondingly shaped seat 23 to close the passage. The valve also has the enlarged tubular portion 24 below the pressure end of the piston 8 and adapted to be clinched over against the upper convolution of the coil spring 25 which extends concentrically within the cylinder and has its lower convolution secured to the sheet metal guide 26 by suitable means, such as the struck out tongues 27. This guide is secured to the bottom wall of the cylinder by the bolt 28 and has the struck out tongue 29 extending into the groove 30 in the bottom wall to hold the guide from rotation.

For loosely securing the valve 21 to the piston 8, I have provided the pin 31 which extends through the diametrically opposite slots 32 in the tubular portion 20 of the piston and within the axially aligned holes 33 of the piston, the slots being of sufficient length to provide for seating of the nose 22 of the valve upon the seat 23 of the piston and also for sufficient movement of the valve in a direction away from the piston to provide for ready flow of the braking liquid through the piston passage or port.

In operation, it will be seen that upon depressing the foot pedal 9 the piston 8 will be advanced in the cylinder 2 and during the early portion of the advance the valve 21 will close the piston port both by reason of the braking liquid in the pressure end of the cylinder and the coil spring 25. As a result pressure will be produced upon the braking liquid to apply the brakes. Upon retractile movement of the piston, the spring 25 serves to retract the valve with the piston until near the final portion of the retractile movement, when the spring is placed under tension and pulls the valve away from its seat to open the piston port.

In the modification illustrated in Figure 2, the same general arrangement of parts as shown in Figure 1 is present, with the exception that the valve 34 has beyond the pressure end of the piston 35 the tubular portion 36 which is crimped over at its lower end to provide the shoulder 37. The cylinder 38 is formed with the shoulder 39 which is adapted to engage the shoulder 37 during the retractile movement of the piston to pull the valve away from its seat in the piston. In this modification, the coil spring 40, if used, serves to assist in retracting the valve with the piston. Clearance is preferably provided between the tubular portion 36 of the valve and the cylinder 38 so that the braking liquid when the valve is in open position may pass through the space as well as through the longitudinal slots 41 through which the pin 42 extends.

Figure 3 illustrates another modification which differs from those of Figures 1 and 2 mainly in providing the piston 43 with the axially aligned holes 44 of greater diameter than the corresponding holes of the previously described modifications. These holes 44 loosely receive the tongues 45 which are struck out from the tubular portion 46 of the valve. The valve further differs in that it has inwardly beyond the pressure end of the piston the longitudinally extending resilient fingers 47, the ends of which are crimped over to provide the shoulders 48 for engaging the annular shoulder 49 formed upon the cylinder 50 to open the valve during the final portion of the retractile movement of the piston. These fingers are adapted to slidably engage only the corner formed at the outer or lower end of the bore of the cylinder to assist in centering the valve, there being clearance at all times between the fingers and the portion of the bore engageable by the piston to avoid wearing and scratching of the latter by the former.

What I claim as my invention is:

1. In a master cylinder, a reservoir, a cylinder communicating at one end with said reservoir and having at the other end a braking fluid port, a piston reciprocable within said cylinder having a port extending generally longitudinally through said piston, a valve having a tubular portion and a convex nose at one end of said tubular portion for closing said piston port, and tongues struck out from said tubular portion and loosely connected to said piston for loosely securing said piston and valve together.

2. In a master cylinder, a reservoir, a cylinder communicating at one end with said reservoir and having an enlargement at the other end forming an annular shoulder, a braking fluid port communicating with the enlargement, a piston reciprocable within said cylinder having a port extending generally longitudinally through said piston, and a valve for controlling said piston port, said valve having a shoulder cooperating with said annular shoulder during the retractile movement of said piston to move said valve to open position.

3. In a master cylinder, a reservoir, a cylinder communicating at one end with said reservoir and having an enlargement at the other end forming an annular shoulder, a braking fluid port communicating with the enlargement, a piston reciprocable within said cylinder having a port extending generally longitudinally through said piston, and a valve for controlling said piston port having a tubular skirt extending into the enlargement and having a shoulder at the end thereof cooperating with said annular shoulder during the retractile movement of said piston to move said valve to open position.

4. A master cylinder having a pair of bores, one of said bores being of smaller diameter than the other bore and cooperating with the latter to form an annular shoulder, a piston reciprocable in the smaller bore and having an axial port therethrough, a reservoir communicating with the rearward end of said piston, and a hollow elongated valve on the pressure side of said piston for controlling said port, said valve having a convex end portion adapted to close said port and an elongated skirt portion extending beyond said annular shoulder and terminating in an annular flange extending radially outwardly from said skirt portion and engageable with said annular shoulder to positively unseat said valve when said piston is in its retracted position.

5. A master cylinder having a pair of bores, one of said bores being of smaller diameter than the other bore and cooperating with the latter to form an annular shoulder, a piston reciprocable in the smaller bore and having an axial port therethrough and an enlarged axial recess in its forward end, a valve on the pressure side of said piston for controlling said port, said valve having a tubular portion extending into the recess in said piston and terminating in a convex end portion adapted to close said port, tongues struck out from said tubular portion and loosely connected to said piston for loosely securing said piston and valve together, and an elongated hollow skirt extending forwardly from the tubular portion of said valve and terminating in an annular flange extending radially outwardly from said skirt and engageable with said annular shoulder to positively unseat said valve when said piston is in its retracted position.

FRANK L. MAIN.